;(12) United States Patent
Schrimpl et al.

(10) Patent No.: US 7,404,537 B2
(45) Date of Patent: Jul. 29, 2008

(54) DEVICE FOR GUIDING TWO SUB-ASSEMBLIES OF A MOTOR VEHICLE WHICH ARE DISPLACEABLE IN RELATION TO ONE ANOTHER, IN PARTICULAR OF A MOTOR VEHICLE SEAT, IN A GUIDE DIRECTION

(75) Inventors: Bernhard Schrimpl, Coburg (DE); Andreas Schmid, Coburg (DE); Martin Schwarz, Coburg (DE); Günther Fletzberger, Bad Rodach (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/580,760

(22) PCT Filed: Nov. 16, 2004

(86) PCT No.: PCT/DE2004/002560

§ 371 (c)(1),
(2), (4) Date: Feb. 14, 2007

(87) PCT Pub. No.: WO2005/051701

PCT Pub. Date: Jun. 9, 2005

(65) Prior Publication Data

US 2007/0274616 A1 Nov. 29, 2007

(30) Foreign Application Priority Data

Nov. 28, 2003 (DE) .............................. 203 18 799 U
Feb. 10, 2004 (DE) ........................ 10 2004 007 252

(51) Int. Cl.
*F16M 13/00* (2006.01)

(52) U.S. Cl. ..................................... 248/424; 296/65.13
(58) Field of Classification Search ................. 248/424, 248/425, 429, 416; 296/65.13, 65.14, 65.15
See application file for complete search history.

(56) References Cited

U.S. PATENT DOCUMENTS 6,328,272 B1 * 12/2001 Hayakawa et al. .......... 248/429

(Continued)

FOREIGN PATENT DOCUMENTS

DE 43 30 133 A1 3/1995

(Continued)

*Primary Examiner*—Ramon O Ramirez
(74) *Attorney, Agent, or Firm*—Christie, Parker & Hale, LLP.

(57) ABSTRACT

A device for guiding two sub-assemblies of a motor vehicle displaceable in relation to one another. Said device comprises two guide elements positioned at a distance from one another in a transversal direction that is perpendicular to the guide direction and two guide units, in which a respective guide element is mounted so that it is displaceable in the guide direction. The guide elements are intercoupled and stops are allocated to the guide elements on the guide units, said stops limiting a displacement of the guide elements in relation to the respective guide units in the transversal direction, perpendicular to the guide direction. A first of the two guide elements in the allocated guide unit is mounted perpendicularly to the guide direction with a negligible displacement margin. The second guide element is mounted in the allocated guide unit with a greater displacement margin in the transversal direction.

31 Claims, 3 Drawing Sheets

U.S. PATENT DOCUMENTS

| | | | | |
|---|---|---|---|---|
| RE38,845 E | * | 10/2005 | Odagaki | 296/65.11 |
| 7,316,442 B2 | * | 1/2008 | Jung et al. | 296/68.1 |
| 2006/0102821 A1 | * | 5/2006 | Kuliha et al. | 248/429 |

FOREIGN PATENT DOCUMENTS

| | | |
|---|---|---|
| DE | 44 16 283 A1 | 11/1995 |
| DE | 195 47 034 A1 | 6/1997 |
| DE | 196 24 979 A1 | 1/1998 |
| DE | 199 04 079 C2 | 8/2000 |
| DE | 199 04 224 C1 | 9/2000 |
| DE | 100 46 745 C1 | 2/2002 |
| DE | 101 13 153 C1 | 4/2002 |
| EP | 0 301 461 B1 | 2/1989 |
| EP | 0 779 174 A2 | 6/1997 |
| EP | 0 813 990 A2 | 12/1997 |

* cited by examiner

DEVICE FOR GUIDING TWO SUB-ASSEMBLIES OF A MOTOR VEHICLE WHICH ARE DISPLACEABLE IN RELATION TO ONE ANOTHER, IN PARTICULAR OF A MOTOR VEHICLE SEAT, IN A GUIDE DIRECTION

CROSS-REFERENCE TO A RELATED APPLICATION

This application is a National Phase Patent Application of International Application Number PCT/DE2004/002560, filed on Nov. 16, 2004, which claims priority of German Utility Model Number 203 18 799.7, filed on Nov. 28, 2003 and German Patent Application Number 10 2004 007 252.3, filed on Feb. 10, 2004.

BACKGROUND

The invention relates to a device for guiding two structural assemblies of a motor vehicle which are displaceable relative to one another, more particularly of a motor vehicle seat, in a guide direction.

A device of this kind comprises two guide elements which are spaced from one another at right angles to the guide direction and which where applicable are coupled to one another by a connecting element, as well as two guide devices in which each one of the guide elements is mounted movable along the guide direction and which can likewise be coupled to one another by a connecting element whereby the guide elements on the guide devices are assigned stops which restrict movement of the guide elements perpendicular to the guide direction (and in the guide direction). The two guide elements on the one hand and the associated guide devices on the other are thereby each associated with one of the two sub assemblies which are displaceable relative to one another.

A device of this kind serves to guide in a defined direction two sub assemblies of a motor vehicle which are displaceable relative to one another, more particularly of a motor vehicle seat, which are able to move relative to one another under the action of an external adjusting force which is applied manually or by external force (e.g. motorised). This can relate to both a longitudinal movement along a straight or curved line and to a swivel movement.

The connecting element through which the two guide elements are coupled to one another need not necessarily run perpendicular to the guide direction; but the two guide elements have along an axis running perpendicular to the guide direction a space which is spanned by the connecting element. The connecting element can serve more particularly for the rigid coupling of the two guide elements and can by way of example be formed by a rigid or partially elastic element of the seat frame of a motor vehicle seat.

The connecting element can be on the one hand a connecting element which serves for the direct connection of the two guide elements or of the two guide devices, such as e.g. a cross tube of a vehicle seat. On the other hand the two guide elements and/or the two guide devices can also each be coupled indirectly to the other, e.g. by mounting the two corresponding sub assemblies on each outer side part of a seat lower frame whereby the two side parts in turn are connected to one another through further structural elements of the seat lower frame.

It is known to provide two substantially rigidly interconnected slide or rotary joints which are each mounted in a base part of a seat structure, such as e.g. a seat side part on the two long sides of a seat trough (on opposites of a motor vehicle seat), with means for compensating assembly and manufacturing tolerances. Noises, more particularly rattling noises are to be avoided hereby.

As means for compensating tolerances are used spring elements which are integrated in the slide or rotary joints consisting of plastics and are active in at least one compensating direction. The tolerances to be compensated can thereby, particularly in the case of sliding guides, lie within the range of some millimeters throughout since alignment errors are also to be compensated. It has however been seen that with a sudden strain on such sliding or rotary joints, e.g. as a result of travelling over uneven road surfaces or with a sudden change of direction or with sharp braking of the vehicle, transversal forces can appear acting perpendicular to the guide direction leading to a sudden compression of the spring elements. The contacting stop faces of the guide elements (in the form of sliding or rotary joints) on the one hand and of the associated guide devices on the other cause noises which the vehicle occupants can find disturbing.

Furthermore the spring elements can permit compensating movements of the relatively displaceable sub assemblies of the motor vehicle seat which the relevant seat user may find uncomfortable.

SUMMARY

The object of the invention is therefore to improve a device for guiding two relatively displaceable sub assemblies of a motor vehicle, more particularly a motor vehicle seat along a guide direction.

BRIEF DESCRIPTION

According to this a first of the two guide elements is mounted in the associated guide device with such negligible displacement margin or such little bearing space perpendicular to the guide direction that in the guide device a substantially rattle-free movement of the guide element along the guide direction becomes possible and at the same time a substantial (subjectively traceable) movement of the guide element perpendicular to the guide direction is prevented. The second guide element is mounted conversely with a greater displacement margin perpendicular to the guide direction in the associated guide device.

The bearing region formed by the first of the two guide elements and the associated guide device thus form substantially one fixed bearing which indeed still has sufficient bearing clearance to permit a friction-free movement of the corresponding guide element relative to the associated guide device in the guide direction but which at the same time does not allow any substantial (subjectively traceable) movement of the guide element relative to the guide device perpendicular to the guide device and hereby prevents rattling noises. The other second guide element is however mounted in the manner of a floating bearing with so much displacement margin perpendicular to the guide direction in the associated guide device that under the action of transverse forces perpendicular to the guide direction the first guide element can enter into engagement with a stop of the associated guide device without the second guide element entering into engagement with a stop of the guide device allocated to same. This applies in the event of stresses which in normal operation of a motor vehicle occur when driving over uneven ground or the like. If however as a result of an accident such large transverse forces appear in the form of crash forces so that the first guide element and/or the associated guide device is damaged or even destroyed then as an exception as an additional crash safety measure the second guide element and the associated guide device can enter into engagement with one another.

The different displacement margins between the first guide element and associated guide device on the one hand and the second guide element and the associated guide device on the other can be achieved according to one embodiment of the invention in that the first guide element is mounted with smaller clearance perpendicular to the guide direction in the associated guide device than the second guide element. Alternatively or in addition in a further embodiment it can be proposed that the first guide element (by using suitable elastic means) is mounted with less elasticity perpendicular to the guide direction in the associated guide device than the second guide element.

The relevant guide device can form on the one hand a longitudinal guide so that the associated guide elements are configured as sliders and the two intercoupled guide elements form one pair of sliding guide elements mounted sliding in the associated guide devices, e.g. in the form of a guide slide.

According to another embodiment of the invention the relevant guide device is designed as a swivel guide so that the two guide elements form a pair of swivel elements whose elements each engage in an associated guide device to form a swivel bearing.

According to a preferred further development of the invention at least one of the guide elements interacts with the associated guide device perpendicular to the guide direction through elastic means whereby the corresponding guide element can be supported on the associated guide device by the elastic means. The relevant guide element can then with the appearance of transversal forces move into engagement with the associated guide device through the corresponding elastic means perpendicular to the guide direction in that the elastic means become blocked (more particularly compressed).

The elastic means which act between the first guide element and the associated guide device thereby have a greater stiffness and/or smaller maximum spring path than the elastic means which act between each second guide element and the associated guide device. It is hereby reached that the elastic means associated with the first guide element (with greater stiffness or smaller maximum spring path) under a predeterminable load in the spring direction (tolerance compensating direction perpendicular to the guide direction) prevent the elastic means assigned to the second guide element from becoming blocked. The predeterminable load thereby represents such loads which occur during normal use of a motor vehicle, e.g. when travelling over uneven ground, namely taking into account the manufacturing and assembly tolerances.

The elastic means can on the one hand be formed integral on the relevant guide element in the form of a sliding guide or swivel element, thus form an integral constituent part of the relevant guide element. In this case they are preferably made of plastics, more particularly an elastomer, and can be designed as spring tongues, spring eyelets or the like.

According to another embodiment of the invention the spring elastic means are formed by separate spring elements which are supported on one side on the relevant guide element and on the other on the associated guide device.

Those spring elastic means which are assigned to the first guide element and the corresponding guide device have according to an advantageous further development of the invention stops, more particularly in the form of slide feet which are set back slightly relative to the external contour of the spring elastic means so that with a certain deformation (compression) of the elastic means they can move into engagement with a stop face of the associated guide device.

The guide elements are preferably formed in two parts and can be assembled through an opening in the associated guide device and can be connected to one another e.g. through detent or clip elements. Preferably in addition to the detent or clip connection the two parts of each guide element are also connected by an additional fastening element, such as e.g. a threaded bolt with which the guide elements are connected at the same time to the associated seat assembly such as e.g. a seat side part. The two parts of the first guide element can hereby be tensioned relative to each other so that the spring path of the associated elastic means is practically entirely exhausted and the corresponding guide element is mounted substantially free of ply in the associated guide device.

The elastic means associated with the first guide element and the corresponding guide device and which are characterised by comparatively great stiffness and small spring path can also be formed by a substantially solid constituent part of a guide element which is made of plastics (more particularly an elastomer) whereby the elasticity is based on the material used.

A seat frame or motor vehicle seat with a device according to the invention for guiding two seat sub-assemblies which are displaceable relative to one another is characterised by the features in claims 22 and 23.

BRIEF DESCRIPTION OF THE DRAWINGS

Further features and advantages of the invention will be explained in the following description of embodiments with reference to the drawings.

DETAILED DESCRIPTION

Figure 1:
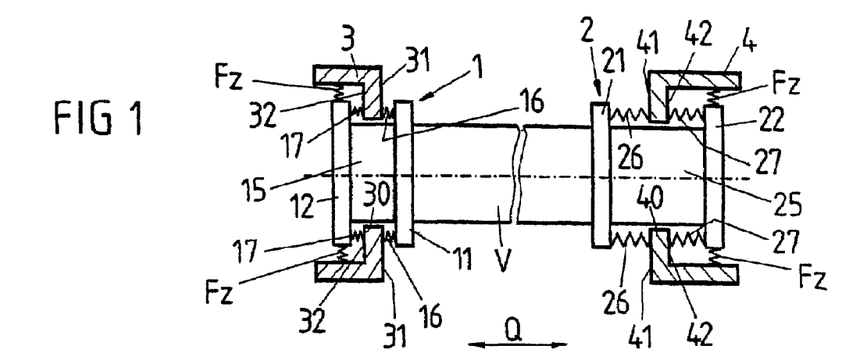
FIG. 1 is a diagrammatic view of two guide elements coupled substantially rigidly to one another through a connecting element in a device for guiding two relatively displaceable sub-assemblies of a motor vehicle seat.

FIG. 1 shows diagrammatically two guide elements 1, 2 each consisting of two guide parts 11, 12 and 21, 22 which are each arranged on either side of a guide device 3 and 4 and are connected to one another through a fastening section 15 and 25. The corresponding fastening section 15, 25 thereby engages through a guide opening 30 and 40 respectively in the relevant guide device 3 or 4.

The guide openings 30, 40 of the guide device 3, 4 can form on the one side (straight lined or curved) elongated guideway or guiding slides so that the guide elements 1, 2 are guided as sliding guide elements perpendicular to the flat plane sliding in the relevant guide device 3 or 4. The two guide elements 1, 2 which are connected to one another through a connection element V substantially rigidly or partially elastically (partially elastic) in this case form a pair of sliding guide elements.

On the other hand the guide openings 30, 40 of the guide devices 3, 4 can also each form a rotary bearing so that the guide elements 1, 2 are designed as swivel elements which can swivel in the rotary bearing of each associated guide device 3, 4.

In both cases through the rigid coupling of the two guide elements 1, 2 through a connecting element V which extends along a transverse direction Q perpendicular to the guide or moving direction of the guide elements 1, 2 in the associated guide devices 3, 4 it is achieved that the guide elements 1, 2 move in unison and in the same direction in the associated guide devices 3, 4.

The two guide devices 3, 4 can thereby be coupled indirectly to one another in that they are mounted on the two long sides of a uniform frame assembly structure (e.g. a seat support) of a motor vehicle seat.

The two guide elements 1, 2 are each supported on either side of the relevant guide device 3 or 4 through elastic means in the form of spring elements 16, 17 and 26, 27 (shown diagrammatically here by compression springs) against stop faces 31, 32 and 41, 42 of the relevant guide device 3, 4. These spring elements 16, 17 and 26, 27 serve to compensate tolerances and to avoid rattling noises. The direction along which the relevant guide element 1 or 2 is supported either side on the relevant associated guide device 3 or 4 through the corresponding spring elements 16, 17 and 26, 27 thereby corresponds to the extension direction of the rigid or at least partially elastic connecting element V and runs in the transverse direction Q perpendicular to the direction of a possible movement of the guide elements 1, 2 in the associated guide devices 3, 4 (guide direction).

The spring lines marked by reference numerals 16, 17; 26, 27 thereby symbolise each elastically deformable means which can be configured structurally in any suitable form, thus as separate spring elements or as integral elastic regions moulded on the guide parts 11, 12 and 21, 22.

The two spring elements 16, 17 which are associated with a first guide element 1 of the two guide elements 1, 2 thereby have a greater spring stiffness and a smaller maximum spring path than the spring elements 26, 27 which are assigned to the second guide element 2. Furthermore the distance between the two guide parts 11, 12 of the first guide element 1 and the associated stop faces 31, 32 of the corresponding guide device 3 between which the spring elements 16, 17 are supported is less than in the case of the second guide element 2 with the two guide parts 21, 22 and the corresponding stop faces 41, 42 of the associated guide device 4 whereby the spring elements 26, 27 are each likewise supported there between one of the guide parts 21, 22 and each one opposing stop face 41, 42 of the guide device 4.

With the first guide element 1 the two spring elements 16, 17 are in the assembled state already so strongly compressed, thus have a small available maximum spring path that the first guide element 1 and the associated guide device 3 substantially form a fixed bearing which only permit small movements of the first guide element 1 in the transverse direction Q in the associated guide opening 30. Conversely the second guide element 2 and the associated guide device 4 form substantially one floating bearing in which by compression of the spring elements 26, 27 in the form of compression springs acting there in the transverse direction Q substantial, i.e. subjectively traceable movements of the corresponding guide element 2 along the transverse direction Q would be possible.

This has the result that with the appearance of transverse forces which are active along the transverse direction Q and which are produced for example when driving over uneven roads, one of the two spring elements 16, 17 which act between the first guide element 1 and the stops 31, 32 of the associated guide device 3 (depending on the force direction) become compressed until blocked so that one of the two guide parts 11, 12 of the first guide element 1 engages through the corresponding spring element 16 or 17 with the corresponding stop face 31 or 32 of the guide device 3. For this only a slight additional deformation of the corresponding spring element 16 or 17 is required since the spring elements which act at the first guide element 1 are tensioned in any case so strongly against one another that they only permit a slight additional deformation (corresponding to a small maximum available spring path).

Since the first guide element 1 and the second guide element 2 are coupled to one another through the connecting element V the two guide elements 1, 2 are moved in unison both along the guide direction (perpendicular to the flat plane) and also along the transverse direction Q. A movement of the first guide element 1 which leads to the maximum possible deformation of one of the spring elements 16, 17 there results as regards the second guide element 2 in a movement which only exhausts a fraction of the possible spring path of the spring elements 26, 27 which act there in the transverse direction Q. Thus as a rule none of the two guide parts 21, 22 of the second guide element 2 engages under the action of forces appearing during operation of a motor vehicle in the transverse direction Q through the relevant spring element 26 or 27 in engagement with the associated stop face 41 or 42 of the associated guide device 4.

As a result of the bearing of the first guide element 1 in the associated guide device 3 with minimum play in the transverse direction Q sudden movements in the transverse direction Q which are found to be uncomfortable are prevented. The displacement margin existing between the first guide element 1 and the stop faces 31, 32 of the associated guide device 3 (corresponding to the maximum possible additional compressibility of the spring elements 16, 17 there) is thus selected so that a relative movement of the first guide element 1 and the associated guide device 3 is not impaired through a bearing which is overtensioned in the transverse direction Q whereby on the other hand only the smallest possible relative movements in the transverse direction Q are to be possible. In normal operation of the motor vehicle the second guide element 2 generally does not move into engagement with the associated stops 41, 42 of the corresponding guide device 4 but does offer additional protection against excessive transverse movements in a crash situation. If in such a case forces occur which lead to damage of the first guide element 1 and/or the associated guide device 3 so that these cannot prevent a further transverse movement of the first guide element 1 relative to the associated guide device 3, then additionally the second guide element 2 and the corresponding guide device 4 move into engagement with one another through the guide part 21 and the corresponding stop 41 or the other guide part 22 and the corresponding stop 42 (through complete compression of a spring element 26 or 27 acting in the transverse direction there).

Furthermore it can be seen that each of the guide elements 1, 2 are supported also through spring elements $F_z$ in the relevant guide device 3 or 4 which engender tolerance compensation and damping of shocks perpendicular to the transverse direction Q.

Figure 2:
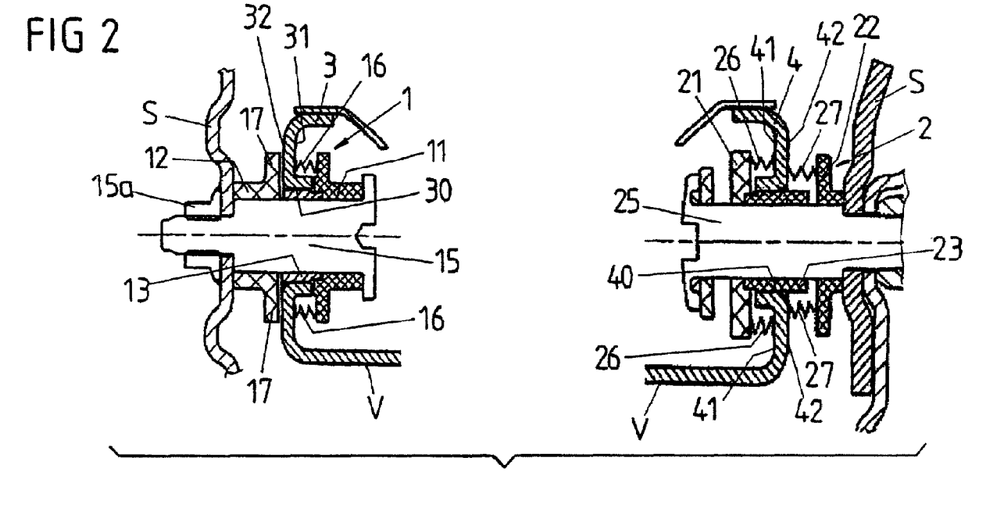
FIG. 2 is a more detailed view of an arrangement of the type shown diagrammatically in FIG. 1.

FIG. 2 shows a more detailed illustration of an arrangement of FIG. 1. According to FIG. 2 a bearing bush 13 and 23 is mounted both on a guide part 11 of the first guide element 1 and on a guide part 21 of the second guide element 2, through which (bush) the corresponding guide element 1 or 2 engages in the guide opening 30 or 40 of the associated guide device 3, 4.

Here the two guide devices 3, 4 are coupled directly to one another through a connecting element V whilst the two guide elements 1, 2 are connected indirectly with each other by fixing on a side structural part S of a vehicle assembly unit.

Furthermore it is clear that the relevant fastening element 15, 25 in the form of a fixing bolt through which the two guide parts 11, 12 and 21, 22 of each one guide element 1, 2 are connected to one another, also connects the corresponding guide element 1, 2 to a structural part S of a motor vehicle seat, such as for example a seat side part. This can be one of the two structural units which are displaceable relative to one another along a guide direction by the guide elements 1, 2 and the associated guide devices 3, 4. The other of the two structural sub assemblies is consequently connected to at least one of the guide devices 3, 4.

Finally it can be seen from FIG. 2 that on a guide part 12 of the first guide element 1 the elastically deformable means 17 are only provided by the choice of a sufficiently deformable material for the base body of the said guide part 12. No means are provided there which act elastically as a result of their geometry. This is possible because the first guide element 1 is in any case to be able to only execute slight movements in the transverse direction Q relative to the associated guide device 3.

In order to ensure a correctly positioned defined assembly of the guide elements 1, 2 and the relevant associated guide devices 3, 4 the two bearing bushes 13, 23 which are associated with the first and second guide element 1, 2 can have a different size whereby the relevant fastenings element 15, 25 also have different thread sizes adapted accordingly.

Moreover the arrangement illustrated in FIG. 2 coincides with that illustrated diagrammatically with reference to FIG. 1 whereby the same reference numerals were each used for matching structural elements. Therefore to complete the description of FIG. 2 reference is made to the corresponding details regarding FIG. 1.

The first guide element 1 and the associated guide device 3 will now be explained in detail below in a concrete embodiment.

Figure 3A:
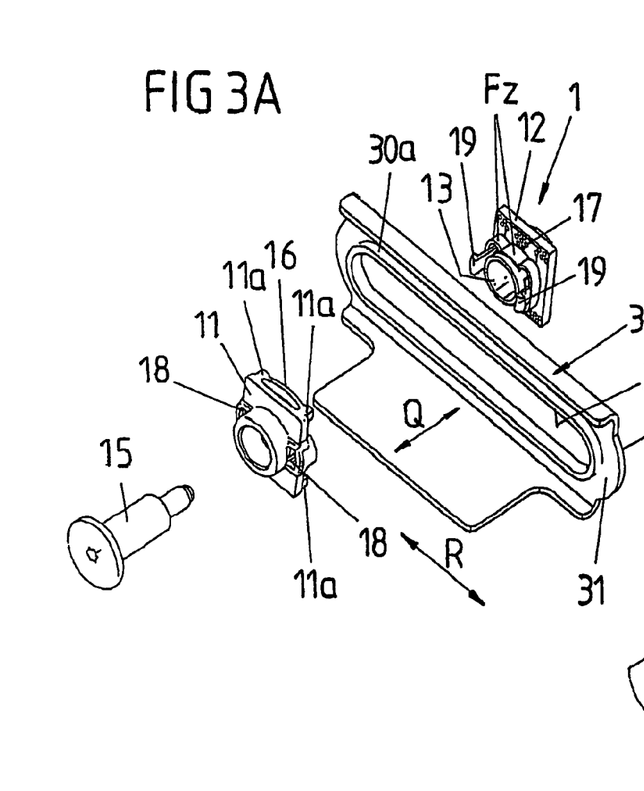
FIG. 3a is a detailed view of one of the guide elements of FIGS. 1 and 2.

The first guide element 1 in the form of a sliding guide element consists accordingly of two slider parts 11, 12 of plastics which, viewed in the transverse direction, are arranged either side of a guiding slide 30 of the associated guide device 3 and are connected to one another through a clip connection 18, 19 which engages through the guiding slide 30. This clip connection is formed by detent openings 18 on one slider part 11 and associated clip hooks 19 on the other slider part 12. In the connected state of the two slider parts 11, 12 the clip hooks 10 engage through the guiding slide 30 of the guide device 3, like a bearing bush 13 of the first guide element 1 through which the guide element is mounted longitudinally displaceable in the guiding slide 30.

Figure 3B:
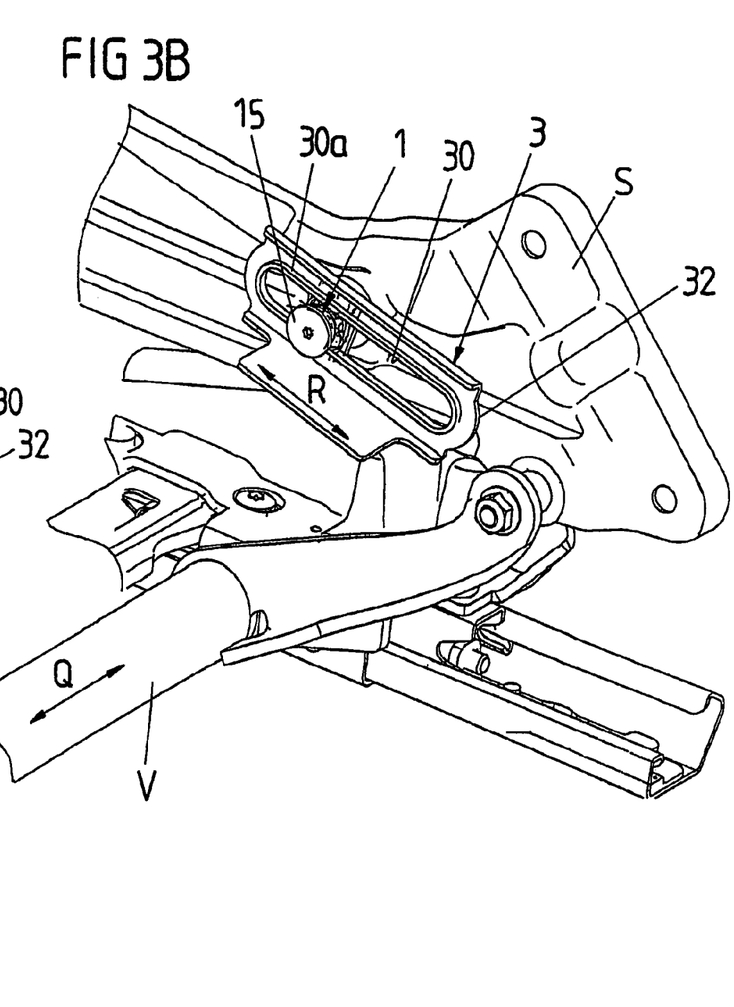
FIG. 3b is the guide element of FIG. 3a in the installed state.

The clip hooks 1 and the associated detent openings 18 on the two slider parts 11, 12 of the first guide element 1 thereby only serve to pre-fix the two slider parts 11, 12. The final fixing of the two slider parts 11, 12 against one another is undertaken by a screw bolt 15 which according to FIG. 3b is fixed by a nut 15a on a structural part S of a motor vehicle seat, namely a seat side part, and thereby tensions the two slider parts 11, 12 of the first guide element 1 relative to each other. The elastic means 16 formed in one piece on the inner slider part 11 in the form of an elastic section are thereby deformed so widely that slide feet 11a provided on this slider part 11 bear against a projection 30a projecting in the direction of the slider part 11 from the guide device 3 and defining the guiding slide 30 and at the same time are spaced in the transverse direction Q only slightly from the stop face 31 of the guide device 3 associated with the slider part 11.

The slide feet 11a are thereby set back viewed in the transverse direction Q from the elastic region 16 of the corresponding slider part 11 so that they can then only move into engagement with the associated stop 31 of the guide device 3 when the moulded elastic means 16 are sufficiently deformed. A large part of this deformation is already carried out when the two slider parts 11, 12 are tensioned by the threaded bolt 15 so that in the assembled state of the guide element 1 only little play remains for a movement transversely to the guide direction R through further deformation of the said elastic means 16. This means that there is still only a slight maximum exhaustible spring path available until the slide feet 11a move into engagement with the associated stop 31 of the guide device 3.

On the other outer slider part 12 the elastic means 17 (elastic section) which act in the transverse direction Q are formed by the elasticity of the material used for the base body of this slider part 12. Specially shaped spring elastic regions are not provided here. Furthermore in the region of the bearing bolt 13 spring means Fz are formed on the outer slider part 12 to serve as rattle protection for support of the guide element 1 on the projection 30a of the guiding slide 30 in a direction perpendicular to both the guide direction R and the transverse direction Q.

Figure 4A:
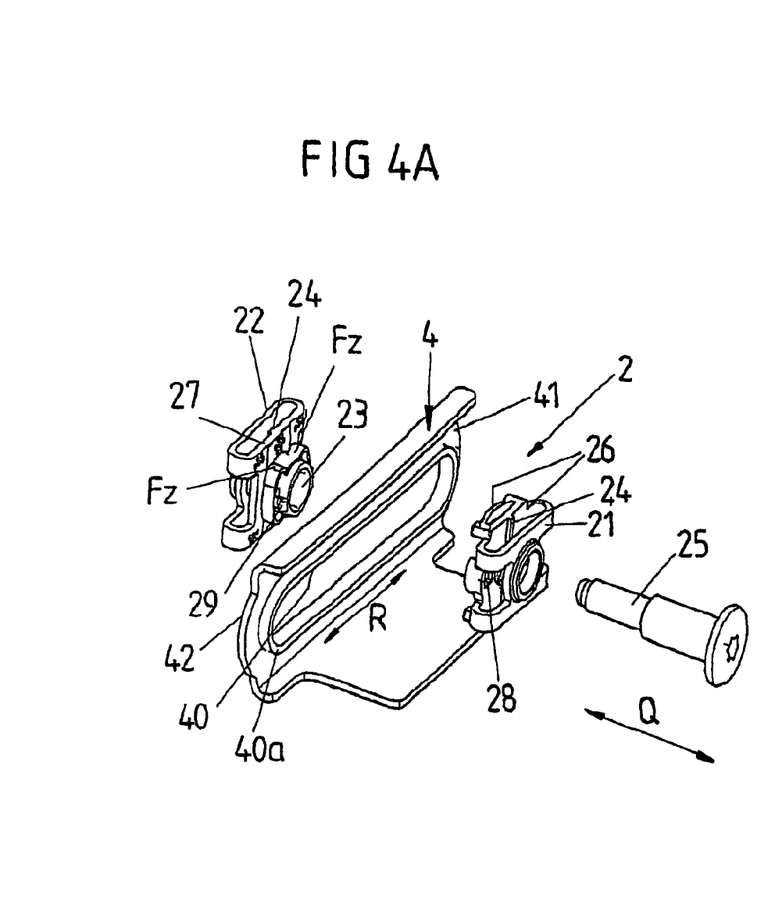
FIG. 4a is a detailed view of a second guide element of the arrangement illustrated in FIGS. 1 and 2.
Figure 4B:
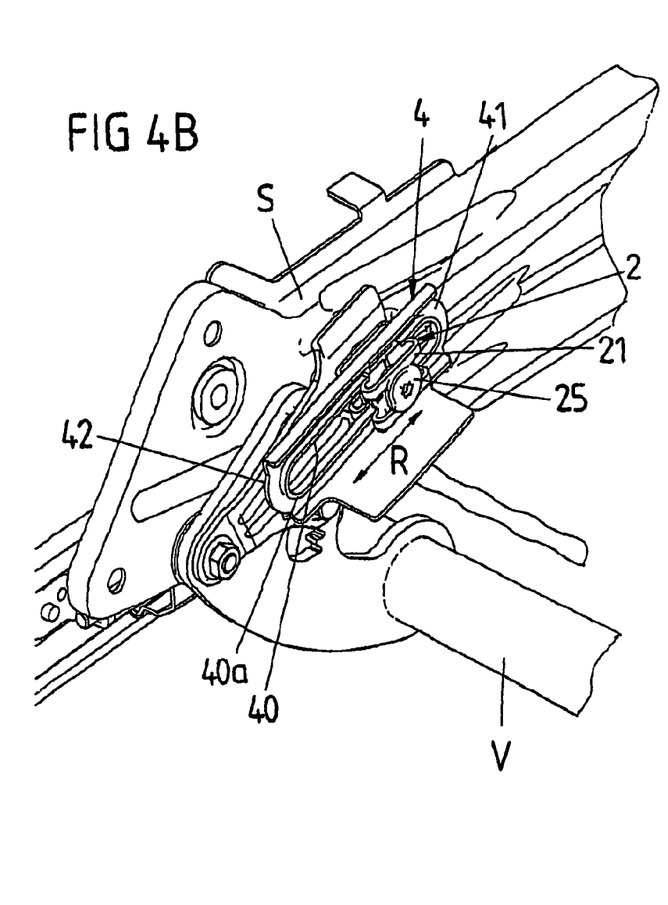
FIG. 4b is the guide element of FIG. 4a in the installed state.

By comparing FIGS. 3b and 4b it becomes apparent that the rigid coupling of the first guide element 1 to the other guide element takes place through a connecting element V in the form of a cross tube of a vehicle seat which is not connected directly to the two guide elements 1,2 but is rather connected at each of its two ends to a seat side part S on a long side of a motor vehicle seat whereby one of the guide elements 1 and 2 is fixed on each of the two seat side parts S by a threaded bolt 15 or 25.

Each one of the guide devices 3, 4 is then mounted displaceable by the associated guiding slide 30, 40 on a corresponding seat side part S and on the guide element 1 or 2 fixed thereon. The two guide devices 3, 4 can be connected by way of example to a cushion support which serves to hold a seat cushion of the corresponding motor vehicle seat and which can be displaced along the guide direction R relative to the seat side parts S, which corresponds to an adjustment of the seat cushion depth.

Obviously the corresponding guide assembly can also be used for any other adjustment devices in motor vehicle seats or on other vehicle parts in which two guide elements spaced from one another transversely to the guide direction of the relevant adjustment movement are coupled to one another (substantially rigidly) and are guidable each in a guide device (in the form of a guiding slide or rotary bearing for example).

FIG. 4a shows finally in larger detail the second guide element 2 of the guide assembly with the associated guide device 4. This also has a guiding slide 40 extending in the guide direction R with a circumferential projection 40a protruding inwards in the direction of an inner slider part 21 of the guide element 2.

The second guide element 2 in the form of a sliding guide element likewise consists in turn of two slider parts 21, 22, namely an inner slider part 21 and an outer slider part 22 which can be provisionally connected to one another by clip hooks 29 engaging through the guiding slide 40 and associated detent openings 28. The final fixing is carried out in turn by a threaded bolt 25 which as in the case of the first guide element 1 illustrated in FIG. 3a engages through corresponding openings in the two slider parts 21, 22 as well as through the guiding slide 40 and which is screwed into the seat side part S.

Furthermore also here one of the two slider parts 21, 22 engages with a bearing bush 23 in the guiding slide 40 of the guide device 4 whereby in the region of the bearing bush 23 spring elements Fz acting as rattle protection are formed on the corresponding slider part 22 perpendicular both to the guide direction R and the transverse direction Q.

The elastic means 26, 27 (elastic sections) of the two slider parts 21, 22 of the second guide element 2 acting in the transverse direction Q are configured so that even after tensioning of the slider parts 21, 22 they can still be deformed substantially more by the threaded bolt 25, whereby the guide element 2 moves in the transverse direction Q relative to the guide device 4. This is a quasi floating bearing.

The spring elastic means 26, 27 of the second guide element 2 acting in the transverse direction Q are arranged and dimensioned so that they are generally not compressed into a block under the action of transverse forces along the said direction Q, unless this is already the case with the corresponding spring elastic section 16 or 17 of the first guide element 1 (see FIGS. 3a and 3b). The slider parts 21, 22 of the second guide element 2 can thus only then engage with the associated stops 41, 42 of the guide device 4 through complete deformation of the spring elastic means 26, 27 into a block, i.e. up to the transverse ribs 24 meeting the opposing regions of the relevant spring elastic section, if the first guide element 1 and/or the associated guide device 3 had become so severely damaged that they cannot fully absorb the forces acting in the transverse direction Q.

The invention claimed is:

1. A device for guiding two sub assemblies of any one of a motor vehicle and a motor vehicle seat, the two subassemblies being displaceable relative to one another along a guide direction, the device comprising:
    two guide elements spaced apart from one another in a transverse direction perpendicular to the guide direction;
    two guide devices in each of which one of the guide elements is mounted movable along the guide direction;
        wherein one of: (a) the guide elements are coupled to one another, (b) the guide devices are coupled to one another, and (c) the guide elements and the guide devices are coupled to one another, and stops are associated with the guide elements on the guide devices to restrict movement of the guide elements relative to the respective guide devices along the transverse direction perpendicular to the guide direction;
    wherein a first of the two guide elements is mounted in the associated guide device with a small displacement margin perpendicular to the guide direction, wherein the displacement margin is configured such that a relative movement of the guide element and the associated guide device is possible in the guide direction and a substantial relative movement is prevented along the transverse direction; and
    wherein the second guide element is mounted with greater displacement margin than the displacement margin of the first of the two guide elements along the transverse direction in the associated guide device.

2. The device according to claim 1, wherein the displacement margin with which the second guide element is mounted is configured such that under action of forces along the transverse direction the first guide element is movable into engagement with the stop of the associated guide device without the second guide element moving into engagement with the stop of the associated guide device.

3. The device according to claim 2, wherein an elastic means act in a direction both perpendicular to the guide direction and to the transverse direction between at least one of the first guide element and the second guide element on the one hand and each respectively associated guide device on the other hand.

4. The device according to claim 1, wherein a bearing play along the transverse direction with which the first guide element is mounted in the associated guide device is smaller than a bearing play with which the second guide element is mounted in the associated guide device.

5. The device according to claim 1, wherein an elasticity along the transverse direction with which the first guide element is mounted in the associated guide device is less than an elasticity with which the second guide element is mounted in the associated guide device.

6. The device according to claim 1, wherein the guide devices form a longitudinal guide on which the guide elements are guided as sliding guide elements.

7. The device according to claim 1, wherein the guide devices form a rotary bearing in which the guide elements are guided as swivel elements.

8. The device according to claim 1, wherein at least one of the guide elements interacts with the associated guide device along the transverse direction through elastic means.

9. The device according to claim 8, wherein the elastic means are formed in one piece on the respective guide element.

10. The device according to claim 9, wherein the elastic means comprises at least one of plastics and elastomer.

11. The device according to claim 8, wherein the elastic means are mounted as separate elements on the respective guide element and are supported on this respective guide element.

12. The device according to claim 8, wherein the elastic means are formed by one of spring tongues and spring eyelets.

13. The device according to claim 8, wherein on the first guide element stops are provided.

14. The device according to claim 13, the stops are configured as slide feet which in the transverse direction and in relation to the associated stop face of the guide device are set back from the outer contour of the elastic means there of the first guide element.

15. The device according to claim 1 or claim 12, wherein at least one part of the elastic means acting in the transverse direction on the first guide element is formed by use of an elastic material for the first guide element.

16. The device according to claim 2 or claim 13, wherein at least one part of an elastic means acting in the transverse direction on the first guide element is formed by use of an elastic material for the first guide element.

17. The device according to claim 8, wherein the two guide elements each interact with their associated guide device along the transverse direction through the elastic means.

18. The device according to claim 8, wherein the respective guide element is movable along the transverse direction into engagement with the associated guide device through the elastic means.

19. The device according to claim 17, wherein the elastic means acting between the first guide element and the associated guide device have a greater stiffness than the elastic means acting between the second guide element and the associated guide device.

20. The device according to claim 17, wherein the elastic means acting between the first guide element and the associated guide device have a smaller maximum available spring travel in the transverse direction than the elastic means acting between the second guide element and the associated guide device.

21. The device according to claim 17, wherein the elastic means acting between the first guide element and the associated guide device in the transverse direction, in comparison with the elastic means acting between the second guide element and the associated guide device in the transverse direction, have at least one of a greater stiffness and a smaller maximum available spring travel such that the elastic means acting between the first spring element and the associated guide device in the transverse direction, under a predeterminable load in the transverse direction, prevent a complete pass of the spring travel of the elastic means acting between the second guide element and the associated guide device in the transverse direction.

22. The device according to claim 21, wherein the predeterminable load represents loads occurring during accident-free operation of the motor vehicle.

23. The device according to claim 17, wherein the elastic means acting between the first guide element and the associated guide device have a greater stiffness than the elastic means acting between the second guide element and the associated guide device and wherein the respective guide element is movable along the transverse direction into engagement with the associated guide device through the elastic means.

24. The device according to claim 1, wherein the guide elements comprise several parts.

25. The device according to claim 24, wherein the two parts of the respective guide element, through a guide opening of the respective associated guide device, are joinable and connectable to one another.

26. The device according to claim 25, wherein the connection of the two parts of the respective guide element is provided through at least one of clip elements and a threaded bolt.

27. The device according to claim 24, wherein the two parts of the first guide element are tensioned with respect to each other so that no substantial spring travel becomes available for further deformation of the elastic means acting in the transverse direction on the corresponding guide element.

28. The device according to claim 1, wherein elastic means act in a direction both perpendicular to the guide direction and to the transverse direction between at least one of the first guide element and the second guide element on the one hand and each respectively associated guide device on the other hand.

29. A seat frame comprising a device for guiding two seat sub assemblies of any one of a motor vehicle and a motor vehicle seat, the subassemblies being displaceable relative to each other along a guide direction, the device comprising:
two guide elements spaced apart from one another in a transverse direction perpendicular to the guide direction and;
two guide devices in each of which one of the guide elements is mounted movable along the guide direction;
wherein one of: (a) the guide elements are coupled to one another, (b) the guide devices are coupled to one another, and (c) the guide elements and the guide devices are coupled to one another, and stops are associated with the guide elements on the guide devices to restrict movement of the guide elements relative to the respective guide devices along the transverse direction perpendicular to the guide direction;
wherein a first of the two guide elements is mounted in the associated guide device with a small displacement margin perpendicular to the guide direction, wherein the displacement margin is configured such that a relative movement of the guide element and the associated guide device is possible in the guide direction and a substantial relative movement is prevented along the transverse direction; and
wherein the second guide element is mounted with greater displacement margin than the displacement margin of the first of the two guide elements along the transverse direction in the associated guide device.

30. A motor vehicle seat with a seat frame, the seat frame comprising a device for guiding two seat sub assemblies of a motor vehicle which are displaceable relative to each other along a guide direction, the device comprising:
two guide elements spaced apart from one another in a transverse direction perpendicular to the guide direction; and
two guide devices in each of which one of the guide elements is mounted movable along the guide direction;
wherein one of: (a) the guide elements are coupled to one another, (b) or the guide devices are coupled to one another, and (c) the guide elements and the guide devices are coupled to one another, and stops are associated with the guide elements on the guide devices to restrict movement of the guide elements relative to the respective guide devices along the transverse direction perpendicular to the guide direction;
wherein a first of the two guide elements is mounted in the associated guide device with a small displacement margin perpendicular to the guide direction, wherein the displacement margin is configured such that a relative movement of the guide element and the associated guide device is possible in the guide direction and a substantial relative movement is prevented along the transverse direction; and
wherein the second guide element is mounted with greater displacement margin than the displacement margin of the first of the two guide elements along the transverse direction in the associated guide device.

31. A motor vehicle seat with a seat frame, the seat frame comprising a device for guiding two seat sub assemblies of a motor vehicle which are displaceable relative to each other along a guide direction, the device comprising:
two guide elements spaced apart from one another in a transverse direction perpendicular to the guide direction; and
two guide devices in each of which one of the guide elements is mounted movable along the guide direction;
wherein one of: (a) the guide elements are coupled to one another, (b) the guide devices are coupled to one another, and (c) the guide elements and the guide devices are coupled to one another, and stops are associated with the guide elements on the guide devices to restrict movement of the guide elements relative to the respective guide devices along the transverse direction perpendicular to the guide direction;
wherein a first of the two guide elements is mounted in the associated guide device with a small displacement margin perpendicular to the guide direction, wherein the displacement margin is configured such that a relative movement of the guide element and the associated guide device is possible in the guide direction and a substantial relative movement is prevented along the transverse direction;

wherein the second guide element is mounted with greater displacement margin than the displacement margin of the first of the two guide elements along the transverse direction in the associated guide device; and wherein the displacement margin with which the second guide element is mounted is configured such that under action of forces along the transverse direction the first guide element is movable into engagement with the stop of the associated guide device without the second guide element moving into engagement with the stop of the associated guide device.

* * * * *